United States Patent Office 2,887,723
Patented May 26, 1959

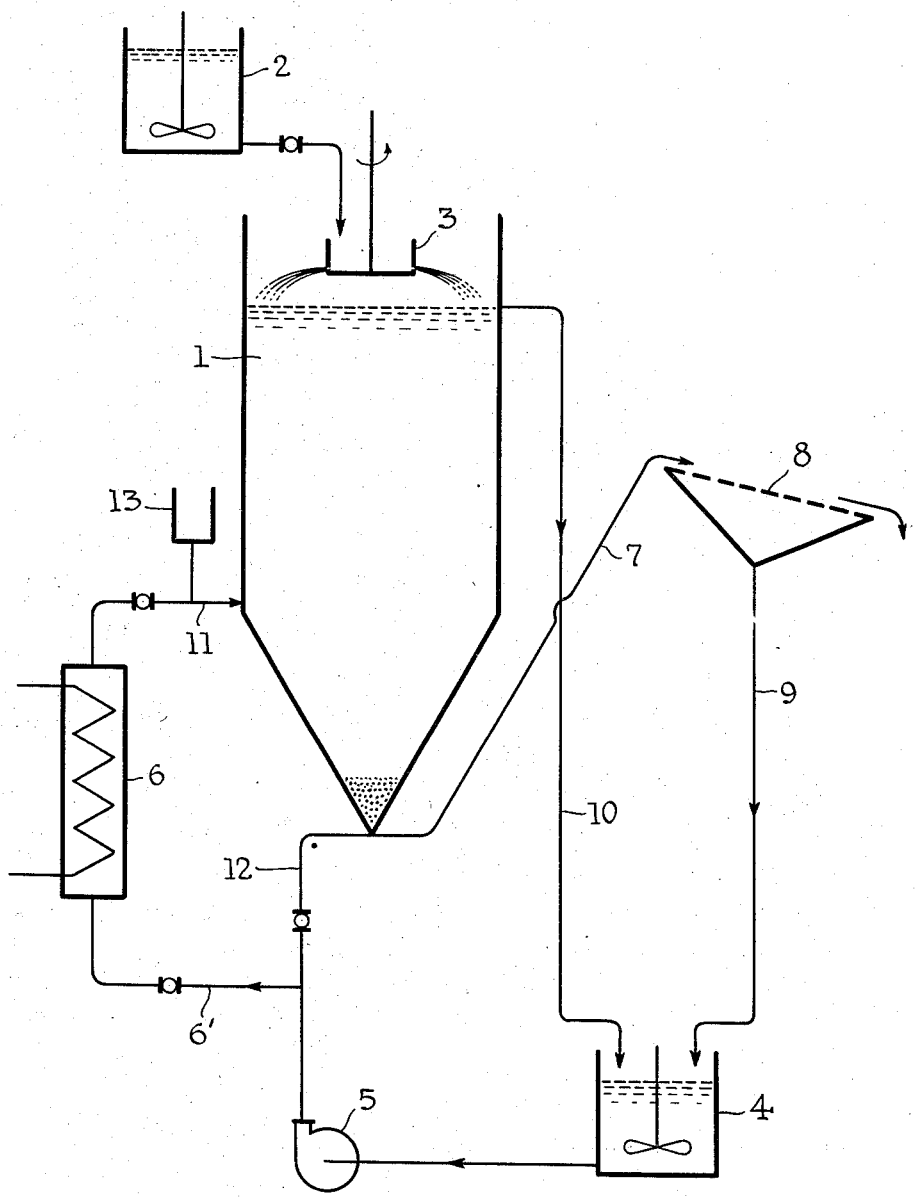

2,887,723

PROCESS FOR GRANULATING MATERIAL

Gerardus Hallie and Johan W. Hoogendonk, Geleen, Netherlands, assignors to Stamicarbon N.V., Heerlen, Netherlands Application February 17, 1956, Serial No. 566,249

Claim priority, application Netherlands February 23, 1955

10 Claims. (Cl. 18—47.2)

This invention relates to a process for granulating material by dividing the material while in liquid form into drops and causing the drops to solidify by reducing their temperature.

A method of preparing granules is known according to which aqueous melts, e.g. of ammonium nitrate, nitrate of lime or urea, are granulated by dividing them into drops and allowing these drops to solidify during their free fall in a liquid in which the drops are insoluble. In this type of process, a considerable fall distance is required in those cases where the drops consist of slowly crystallizing substances, e.g. a melt of nitrate of lime, or nitrate of lime containing ammonium nitrate in such an amount that the composition of the melt is, roughly, $5Ca(NO_3)_2.NH_4NO_3.10H_2O$, which melts tend to form supercooled melts on cooling.

In order to make the drops solidify more quickly and thus shorten the fall, it has already been proposed to add seed crystals to the material to be granulated immediately before the formation of the drops. (See, for example, French Patent No. 665,512.)

However, this process sometimes gives rise to difficulties, due to the circumstance that the seed crystals melt rapidly at the temperature of the melt to be granulated, or else, the material to be granulated begins to crystallize before being divided into drops, thereby forming a pasty mass which clogs the spray nozzle used in forming the drops.

In addition, irregular grains are obtained by the known procedure because, as a result of rapid decrease in plasticity during the accelerated solidification process, the drops do not have time to assume a perfectly spherical shape.

Now, applicants have found that an improvement can be realized in the granulating process if the drops are allowed to fall through a liquid in which is suspended a seeding material, i.e. a material of the same composition as the substance to be granulated, or an isomorphous material.

A granulating process embodying the invention is illustrated diagrammatically in the accompanying drawing, which will be referred to in the following detailed description of the operation of the process of the invention.

According to this process, the melt—divided into drops—is admitted into the top part of a column 1, filled with a thin mineral oil and provided with an overflow, the drops being formed by a rotating apertured distributor head 3 which is fed from a storage tank 2 containing the melt to be granulated. The oil leaving the column 1 through the overflow is led through conduit 10 to a tank 4 equipped with a stirrer, from which tank the oil is returned by a pump 5, conduit 6', cooler 6 and conduit 11 into column 1.

The oil is preferably fed tangentially into the column 1 through the conduit 11 in order to impart to the oil contained in column 1 a rotating motion, whereby the drops supplied by the head 3 do not fall in a straight line but travel along a spiral path, so that their fall is lengthened.

The solid grains collect in the bottom end of column 1; from here they are carried along through conduit 7 by a flow of oil supplied through conduit 12, and are next delivered onto a sloping screen 8; the grains slide from the screen into a centrifuge, not shown in the drawing, where adhering oil is removed. The coil draining through screen 8 is led into tank 4 through conduit 9.

Finely ground seeding material is continuously added to the oil present in tank 13. By stirring the contents of tank 13, a suspension of seeding material in the oil is obtained, which suspension by reason of the action of pump 5, eventually passes through conduit 11 into the column 1 and there flows slowly upwards.

During its rise, the seeding material fed into column 1 comes into contact with the drops to be solidified and adheres to the surfaces of these drops, so that it promotes crystallization and, hence, solidification of the drops.

Using the process described above and employing a comparatively short path of fall, it is possible to convert readily into solid grains a melt of calcium nitrate containing ammonium nitrate, which crystallizes with difficulty only and which has a composition roughly corresponding to the formula $5Ca(NO_3)_2.NH_4NO_3.10H_2O$.

The following example demonstrates the granulation of such a calcium nitrate melt by the process illustrated.

*Example*

In granulating the calcium nitrate melt, the height of the oil column amounted to 1.6 meters; 1m.$^3$ of oil per hour circulated through the column 1 at an upward velocity of about 10 m. per hour. The total amount of oil in circulation was 1 m.$^3$. The temperature of the melt contained in tank 2 was kept at about 15° C. above the solidification point, the temperature of the oil in column 1 being maintained at 30–80° C. by means of the cooler 6.

About 50 grammes of finely ground seeding material from tank 13 were added to the circulating oil per hour. The seed grains were smaller than 1 mm.; two thirds thereof had diameters between 105 and 350 $\mu$.

When the grains obtained by the above operation were centrifuged in a centrifuge rotating at 2400 r.p.m. and having a diameter of 20 cm., the production amounted to 30 kg. of calcium nitrate grains per hour (N-content 15.5%), their mean diameter being 2 mm.

Experiments have shown that when a given centrifuge is employed, the temperature of the oil in column 1, the water content of the calcium nitrate melt and the amount of seeding material added, all exert considerable influence on the oil content of the calcium nitrate grains eventually produced.

A relatively high oil temperature, e.g. 60–80° C., coupled with a rather low moisture content of the melt, 14–15%, and not too much seeding material, e.g., a concentration in the oil on entering column 1 of only 0.05% by weight, resulted in the formation of a granular final product containing less than 1% by weight of oil. If, on the other hand, both a lower temperature and higher moisture content, e.g. over 16%, and more seeding material, e.g. a concentration of 0.2% were employed, the oil content of the grains may rise to 3–4%. It is considered that, under these last recited operating conditions, the crystallization process is accelerated to such an extent that the drops solidify almost immediately and that, as the grains cool down further, their contraction causes cracks to develop which adsorb oil that cannot be removed by centrifuging. An addition of less than 0.01% of seed material, calculated on the weight of the circulating oil, proved to have no effect on the solidification of the calcium nitrate grains; a favorable influence was observed beginning with the addition of 0.02%. Furthermore, a temperature higher than 80° C. in column 1 was found to be undesirable, as in that case the drops remained weak too long, so that they adhered together and became deformed.

In tests using oil containing a small amount of paraffin, e.g. 10% by weight, which crystallized on cooling, the resulting grains appeared to be coated with a very thin film of solid paraffin, so that they were less sensitive to moisture; on storage these grains showed less caking than did grains without a protective coating.

As will be appreciated, the density of the liquid selected to form the suspension in column 1 should be less than that of the resultant granular product. In the preparation of a lime nitrate-ammonium nitrate product, applicants have successfully used mineral oils of divergent specific gravity and kinematic viscosity e.g.:

|  | spec. gravity at 20° C. | viscosity in centistokes |
| --- | --- | --- |
| light machine oil | 0.89–0.93 | 16.7–21.2 at 50° C. |
| transile oil | 0.87 | 32.6–34.2 at 20° C. |
| gas oil | 0.81–0.84 | 32.–5.2 at 15° C. |
| petroleum | 0.78–0.79 | 1.75 at 15° C. |

We claim:
1. A process for granulating material comprising the following steps: preparing a melt of the material; forming a mixture of a liquid medium and a finely divided seeding substance; maintaining the seeded liquid medium at a temperature below the solidification point of said melt; dividing the melt into drops and causing the drops to fall through the cooler seeded medium, whereby the drops are cooled during their descent through the seeded liquid medium and solidify into uniformly shaped granules.

2. Process according to claim 1, characterized in that the material to be granulated is insoluble in the liquid medium.

3. Process according to claim 1, characterized in that a rotary motion is imparted to the liquid medium while the drops are falling therethrough, whereby the drops follow an extended, spiral path.

4. Process according to claim 1, wherein the contact between the seeded medium and the drops is of a generally countercurrent character.

5. Process according to claim 1, characterized in that the melt comprises calcium nitrate and ammonium nitrate and has the approximate composition $$5Ca(NO_3)_2 \cdot NH_4NO_3 \cdot 10H_2O$$

having an original moisture content of 14–16% by weight, the liquid medium comprising a thin mineral oil maintained at a temperature within the range of about 60°–80° C. and containing seeding substance in an amount within a range of about 0.02–0.2% by weight of the oil.

6. Process according to claim 5, characterized in that the oil contains paraffin crystallizing at room temperatures.

7. A continuous cyclic process for preparing granulated materials comprising the following steps: establishing a column of a cooled suspension of finely divided seed crystals in a liquid which is a non-solvent for the material to be granulated; comminuting a melt of the material to be granulated and causing the comminuted particles to fall through said column of suspension, maintained at a temperature substantially below the solidification point of the melt, whereby the particles are solidified into granules of substantially spherical shape; removing the solidified granules from the lower end of said column; removing overflow of the suspension from the upper end of said column, cooling the same and adding seeding material to the thus cooled suspension; and recycling the cooled, seeded suspension into the lower portion of the column to treat further quantities of comminuted material to be granulated.

8. A process according to claim 7, characterized in that the cooled suspension is introduced in a tangential direction into the suspension column, whereby the latter is rotated and the comminuted particles falling down the column follow an extended, spiral path.

9. Process according to claim 7, wherein the granules removed from the column are treated to remove liquid adhering thereon, and the liquid so separated is recycled to the column.

10. Process according to claim 9, wherein the liquid separation is effected by successive draining and centrifuging operations.

References Cited in the file of this patent
UNITED STATES PATENTS

| 20,250 | Booth | May 18, 1858 |
| 1,378,084 | Bacon et al. | May 17, 1921 |
| 1,776,694 | Luscher | Sept. 23, 1930 |
| 1,889,863 | Luscher | Dec. 6, 1932 |
| 2,570,423 | Batchelder et al. | Oct. 9, 1951 |
| 2,572,998 | Eisher | Oct. 30, 1951 |
| 2,574,357 | Stammer et al. | Nov. 6, 1951 |
| 2,793,398 | Hallie et al. | May 28, 1957 |

UNITED STATES PATENT OFFICE

CERTIFICATE OF CORRECTION

Patent No. 2,887,723                                    May 26, 1959

Gerardus Hallie et al.

It is hereby certified that error appears in the printed specification of the above numbered patent requiring correction and that the said Letters Patent should read as corrected below.

Column 2, line 6, for "coil" read -- oil --; column 3, in the table, third column thereof, under the heading thereto, for "32.-5.2 at 15° C." read -- 3.2-5.2 at 15° C. --.

Signed and sealed this 6th day of October 1959.

(SEAL)
Attest:

KARL H. AXLINE                                                  ROBERT C. WATSON

Attesting Officer                                            Commissioner of Patents